US006319617B1

(12) United States Patent
Jin et al.

(10) Patent No.: US 6,319,617 B1
(45) Date of Patent: Nov. 20, 2001

(54) OXIDE-BONDABLE SOLDER

(75) Inventors: Sungho Jin, Millington; Guenther Wilhelm Kammlott, Basking Ridge; Hareesh Mavoori, Piscataway; Ainissa G Ramirez, Chatham, all of NJ (US)

(73) Assignee: Agere Systems Gaurdian Corp., Orlando, FL (US)

( * ) Notice: Subject to any disclaimer, the term of this patent is extended or adjusted under 35 U.S.C. 154(b) by 0 days.

(21) Appl. No.: 09/642,216

(22) Filed: Aug. 18, 2000

Related U.S. Application Data

(63) Continuation-in-part of application No. 09/466,449, filed on Dec. 17, 1999.

(51) Int. Cl.[7] .................................................. B32B 9/00
(52) U.S. Cl. .................. 428/469; 228/101; 228/903; 420/501; 420/507; 420/513; 420/555; 420/557; 420/563; 420/576; 420/577; 420/580; 420/589; 420/505; 420/511; 420/524; 420/558; 420/559; 420/562; 420/566; 420/570; 420/571; 420/572; 420/574; 428/450; 428/432; 428/433; 428/434; 427/123
(58) Field of Search .................................... 428/469, 450, 428/432, 433, 434; 420/501, 507, 513, 555, 557, 563, 576, 577, 416, 580, 589; 228/101, 903; 427/123

(56) References Cited

U.S. PATENT DOCUMENTS

| | | | |
|---|---|---|---|
| 3,949,118 | 4/1976 | Nagano et al. | 427/123 |
| 4,106,930 | * 8/1978 | Nomaki et al. | 420/589 |
| 4,885,135 | * 12/1989 | Hosoda et al. | 420/507 |
| 5,013,612 | 5/1991 | Hunt et al. | 428/552 |
| 5,139,704 | 8/1992 | Holland et al. | 252/521 |
| 5,308,578 | 5/1994 | Wong | 420/558 |
| 5,340,411 | 8/1994 | Megerle et al. | 148/26 |
| 5,350,105 | 9/1994 | Delalle et al. | 228/56 |
| 5,400,489 | 3/1995 | Hegner et al. | 29/25.41 |
| 5,665,921 | 9/1997 | Gerst et al. | 73/715 |
| 5,953,623 | 9/1999 | Boyko et al. | 438/612 |
| 6,015,083 | 1/2000 | Hayes et al. | 228/254 |
| 6,047,876 | 4/2000 | Smith | 228/111.5 |
| 6,054,693 | 4/2000 | Barmatz et al. | 219/678 |
| 6,063,213 | * 5/2000 | Ogasa | 420/507 |
| 6,121,069 | 9/2000 | Boyko et al. | 438/106 |

OTHER PUBLICATIONS

Manko, H.H. *Solders and Soldering*, McGraw–Hill Inc. (Dec. 1992).
Filas, R.W., "Metallization of Silica Optical Fibers", *MRS Symposium Proc.*, vol. 531, (Dec. 1998).
Mavoori, H. et al., "Enhanced Thermal and Magnetic Actuation for Broad–Range Tuning of FBG–Based Reconfigurable Add/Drop Devices", *Optics Lett.*, vol. 24, No. 11, 714 (Jun. 1999).

* cited by examiner

*Primary Examiner*—Robert R. Koehler
(74) *Attorney, Agent, or Firm*—Scott J. Rittman

(57) ABSTRACT

A solder composition that bonds well to oxides and other surfaces to which solder bonding is conventionally difficult is provided. The solder is particularly useful for reliable bonding and packaging of optical components that often have oxide surfaces. The solder composition exhibits a microstructure containing a solder matrix in which is distributed fine, micron-scale islands of rare-earth-containing intermetallic particles. The existence of the islands makes the rare earth elements better available for bonding, and reduce the extent to which the rare earths are oxidized. Advantageously, the solder contains Au and/or Ag, in which the rare earth elements tend to have some solid solubility. Due to this solubility, the Au and/or Ag tend to provide some additional protection of the rare earths against oxidation, and thereby also provide accelerated dissolution of the rare earth into the molten solder.

26 Claims, 3 Drawing Sheets

OXIDE-BONDABLE SOLDER

CROSS REFERENCE TO PARENT APPLICATION

This application is a continuation-in-part of application Ser. No. 09/466,449, filed on Dec. 17, 1999.

BACKGROUND OF THE INVENTION

1. Field of the Invention

The invention relates to solder compositions, particularly solder compositions useful for bonding to oxides.

2. Discussion of the Related Art

Electronic solders such as Pb—Sn, Sn—Ag, Bi—Sn, and Au—Sn are widely used for bonding of components and circuits in electronic and optoelectronic devices. Numerous other solder compositions, as well as a variety of processing and assembly procedures, are also known. See, e.g., H. H. Manko, *Solders and Soldering*, McGraw-Hill Inc. (1992).

It is generally accepted that the nonmetallic surfaces of oxide materials prohibit direct wetting of conventional solder materials, and therefore require an intermediate bonding layer, also known as a metallization layer, to allow soldering to occur. typically, a thin metallic film layer is deposited onto the oxide surface, and any solder bonding is carried out on that metallic film. For example, soldering on silica optical fiber is able to be accomplished by forming a nickel-containing intermediate layer, e.g., by electroless plating, on the silica surface. (See, e.g., R. W. Filas, "Metallization of Silica Optical Fibers", *MRS Symposium Proc.*, Vol. 531, 263 (1998)). Soldering on ceramic substrates, such as $Al_2O_3$, in hybrid circuits is conventionally accomplished by first metallizing the oxide surface using either a thick-film technique relying on firing of a metal-glass mixture frit at elevated temperatures or a thin film technique relying on sputtering or evaporation of a metal layer. The use of such an intermediary metallization layer, however, is not always desirable due to the added complexity and cost, as well as concerns over bond reliability since there is often no strong chemical bond at the oxide-metal interface.

One approach to these metal-oxide bonding problems has been to incorporate reactive elements, such as rare earth elements, into the solder. The rare earth elements improve the bond by inducing chemical reactions at the interface between the metal and the oxide. See, e.g., U.S. Pat. No. 3,949,118. Unfortunately, the matrix materials of these solders—Sn and Pb—lack solid solubility for the rare earths. And this lack of solubility makes the solders susceptible to significant loss of bonding ability, due to the tendency of the rare earths and the matrix solder to form intermetallics. These intermetallics make the rare earths less available to aid in the bonding process due to the time required to re-dissolve the intermetallic particles into the molten solder, particularly where the intermetallic particles are coarse. This intermetallic formation occurs both during the manufacture of the solders—when the melt is cooled to room temperature, and also later—due to time-dependent reactions of the reactive elements during storage. Also, due to the presence of easily-oxidizable rare earths, oxidation of the molten solder surface during soldering and of the solder joint surface after soldering tends to reduce the reliability of the solder bond. For example, during the process of inter-metallic re-dissolution in molten solder, the oxidation of the rare earth tends to produce oxide skin on the solder surface.

Thus, improved solder materials capable of providing reliable bonds to oxides, yet which avoid problems of previous solders, are desired.

SUMMARY OF THE INVENTION

The invention relates to use of solders containing rare earth metals. While the use of rare earths has previously been contemplated in solder, as mentioned above, problems related to rare earth's easy oxidation and the near-zero solubility in conventional solder metals have not been solved. The invention overcomes these problems by providing a solder material having microstructure that contains a solder matrix in which is distributed fine, micron-scale islands of rare-earth-containing intermetailic particles, i.e., islands having an effective diameter less than 60 $\mu$m, advantageously less than 20 $\mu$m. (Effective diameter indicates the diameter of a sphere having the same volume as a non-spherical island.) It is possible for a matrix to consist of one or more phases.

Advantageously, the solder contains Au and/or Ag, in which the rare earth elements tend to have some solid solubility. Due to this solubility, the Au and/or Ag tend to provide some protection of the rare earths against oxidation, and to accelerate dissolution of the rare earth into the molten solder. The solders of the invention contain typical solder metals, e.g. Sn, Pb, Sb, In, Bi, about 0.02 to about 20 wt. % rare earth metals, and optionally some gold and/or silver. To attain the micron-scale islands containing the rare earths, the solders are generally prepared by rapid solidification from the molten state, to induce formation of relatively small islands and avoid substantial coarsening of the islands.

The resultant solder provides excellent bonding to oxide materials such as glass optical fibers.

DETAILED DESCRIPTION OF THE INVENTION

Figure 1:
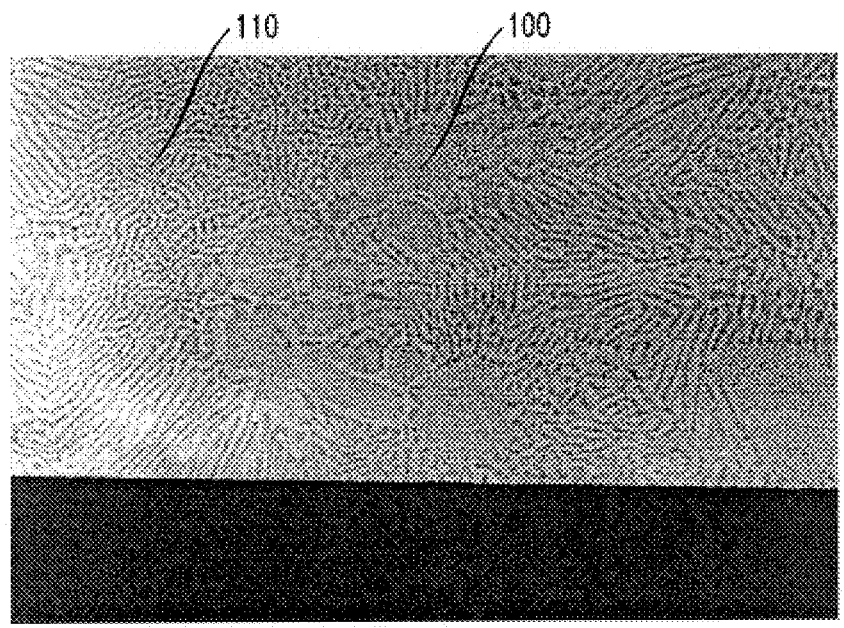
FIG. 1 is an SEM photograph of a Au—Sn—Lu solder of the invention bonded on a silica substrate.

According to the invention, solder compositions are provided with rare earth metals to make the solder reactive with an oxide surface. Suitable rare earths include Y, La, Ce, Pr, Nd, Sm, Eu, Gd, Tb, Dy, Ho, Er, Tm, Yb, and Lu. The rare earth metals have strong thermodynamic affinity to oxygen, and thus, when present in molten solder in contact with an oxide, the rare earths take oxygen atoms away from the oxide surface, reducing the surface to a metal or oxygen-deficient oxide that is better able to bond to the solder. Improved bonding between the solder and the oxide surface is attained. Improved bonding to other problematic surfaces is also possible.

As discussed above, rare earths oxidize easily, and in addition have essentially no solid solubility in the typical metals found in solder (Sn, Pb, Bi, Sb, and In), e.g., typically less than 0.01 wt. %, and also exhibit high melting points, e.g., 780 to 1660° C. Upon being incorporated in such a solder metal, the rare earths therefore tend to be consumed by formation of intermetallics with the other solder metals. Because these intermetallics tend to be stable and have high melting points, when performing a soldering operation it takes time to re-dissolve the intermetallic compounds and retrieve the rare earths, during which time the undesirable oxidation of rare earth in the molten solder continues to progress.

In the solders of the invention, with or without Au and Ag, the microstructure is controlled by rapid solidification, to introduce fine, micron-sized islands of rare earth-containing intermetallic phase. Examples of such intermetallic islands are $Au_4Lu$ in the case of Au-rich Au—Sn—Lu solders, and Sn—Lu in the case of Sn—rich Sn—Ag—Lu solders. For Au-free and Ag-free solders, substantially all of the rare earth is found in the islands. For solders containing Au and/or Ag, the majority of the rare earth is found in the islands. The intermetallic islands are typically isolated from each other, i.e., are typically surrounded by the matrix material. Because the intermetallics that form the islands are relatively stable (thermodynamically), the rare earth atoms are generally offered more protection from oxidation compared to solders without this microstructure, particularly when the islands are located within an oxidation-resistant Au-rich or Ag-rich solder matrix. Specifically, when the matrix comprises Au and/or Ag, the rate of oxidation of rare earths in the islands is generally reduced at least 20%, compared to a substantially identical composition without Au and/or Ag (i.e., compared to a composition where the Au and/or Ag are replaced with conventional solder materials such as Sn, Sb, In, Bi, Zn, and Pb).

An additional benefit of the small islands is that the grain size of the matrix is reduced, e.g., by at least 20%, compared to a substantially identical solder in which the rare earths are replaced with elements that make up the matrix, prepared in an identical manner. The smaller islands thereby tend to provide an increase in solder strength and fatigue resistance, e.g., by at least 20%, compared to such a substantially identical solder.

Figure 2:
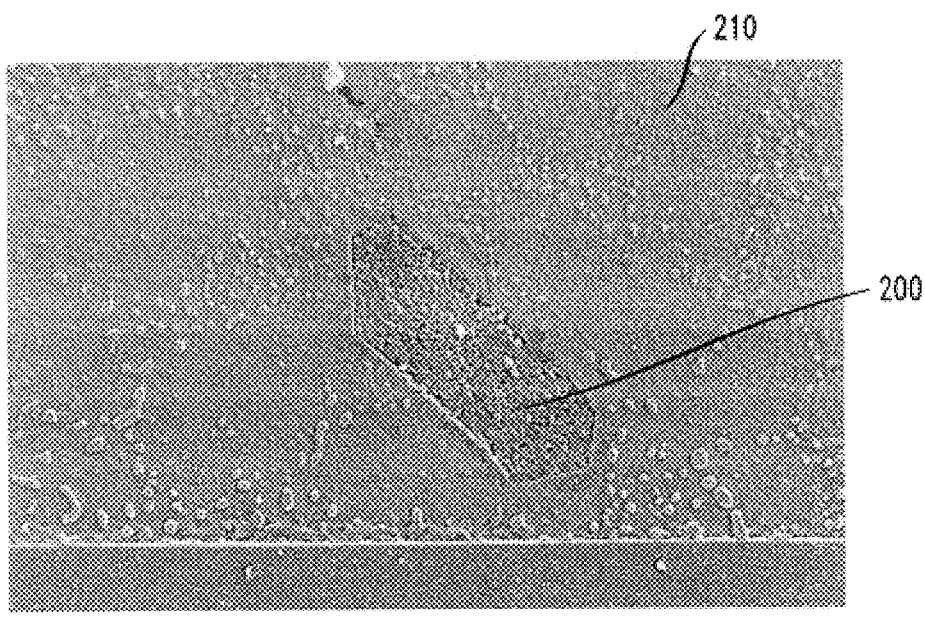
FIG. 2 is an SEM photograph of a Sn—Ag—Lu solder of the invention bonded on a silica substrate.

Keeping the size of the intermetallic islands small is important in providing fast and simultaneous dissolution of many intermetallic islands in the molten solder during a soldering operation. Fast dissolution releases the stored rare earth atoms for a desirable interface bonding reaction onto, e.g., an oxide surface, and the fast dissolution also reduces the duration of rare earth loss by oxidation, compared to slow dissolution, e.g., as encountered with coarser intermetallic islands. In particular, the average equivalent diameter of the rare earth-containing islands (i.e., the diameter of a sphere having the same volume found in a non-spherical island) is typically less than 60 micrometers, advantageously less than 20 micrometers, and more advantageously less than 10 micrometers. Microstructures showing such fine islands of intermetallics are found in FIG. 1 (Au-19.5% Sn-2% Lu solder bonded onto a $SiO_2$ quartz surface, described in Example 6) and FIG. 2 (Sn-3.5% Ag-2% Lu solder bonded onto the quartz surface, described in Example 7). In FIG. 1, fine-scale $Au_4Lu$ islands with equivalent diameters of several micrometers are embedded in an Au—Sn eutectic solder matrix made up of two Au-rich phases. In FIG. 2 small $Sn_3Lu$ islands are embedded in the eutectic Sn—Ag solder matrix.

This microstructure is attainable by using a relatively fast cooling rate when forming the solder composition. (As used herein, solder composition includes the solder in a variety of forms, including solder preforms, wires, ribbons, solder particles in a paste, or thin films prepared by physical deposition or chemical deposition.) Specifically, the cooling rate from a molten state should be at least 1000° C./hour, advantageously at least 6000° C./hour. (For thin film deposition, the substrate is typically kept below 0.8 times the solder melting temperature (in absolute degrees), advantageously below 0.6 times the melting temperature, to avoid substantial coarsening of the intermetallic islands.) This relatively fast cooling introduces large supercooling during solidification, and a higher number of nucleation sites for the formation of solid products. The higher number of nucleation sites result in formation of the relatively small islands of intermetallics.

Figure 3:
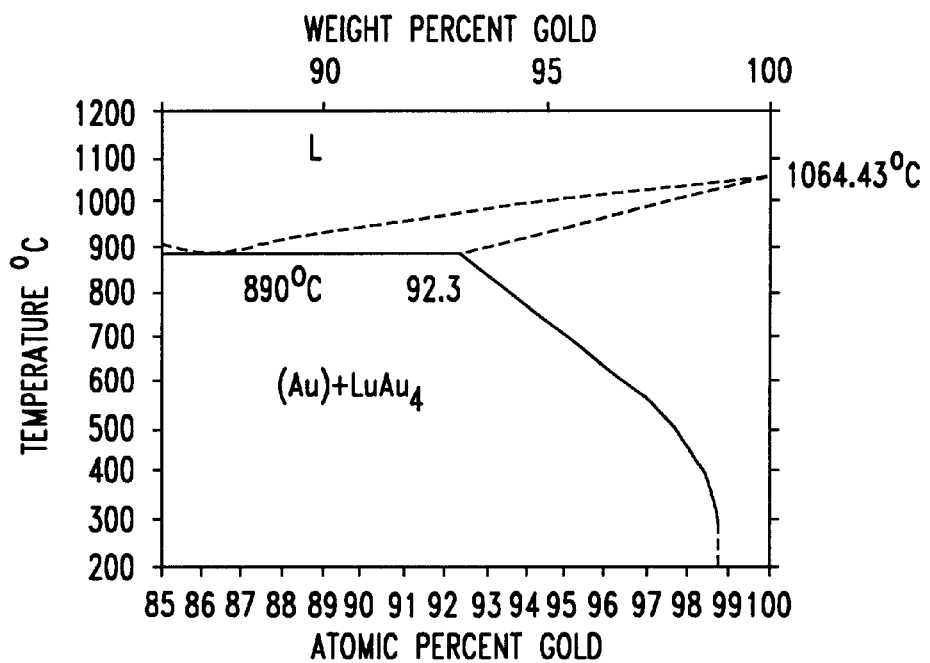
FIG. 3 is the Lu—Au binary alloy phase diagram.

Use of Au and/or Ag in the solder composition provides improved protection against oxidation of rare earth, and also tends to provide some solid solubility for the rare earths, which further reduces such oxidation. (See, e.g., the solubility of Lu in Au, as shown in FIG. 3, which is the phase diagram for Lu—Au.) Specifically, it is believed that the movement of oxygen through a matrix containing Ag or Au, to which oxygen does not bind and in which oxygen in not soluble, will be more difficult, and the Au and/or Ag will thereby reduce the extent of rare earth oxidation. The importance of keeping the rare earths free of oxidation is reflected in Example 3 below, which shows that the use of the solder of the invention results in an interfacial region at the solder-surface interface. The rare earth element or elements appear to segregate at the interface during soldering, thereby aiding the bonding process.

The typical amount of the one or more rare earth elements is 0.01–20 wt %, more typically 0.1–5 wt %, and even more typically 0.2–2 wt %, based on the weight of the entire solder composition, with the actual amount varying depending on a number of parameters, for example, the degree of desired reactivity at the solder-substrate interface, the microstructural size of rare-earth-containing islands in the solder composition, the solubility of the particular rare earth element or elements in the Au or Ag, and the amount of Au or Ag present.

It is possible to base the solders of the invention on any conventional solders, e.g., elemental metals of Sn, Sb, In, Bi, Zn, Pb, Ag, or Au, or binary, ternary or quaternary solders based on Au—Sn, Pb—Sn, Bi—Sn, Sn—Ag, Sn—Zn, or Sn—Sb (eutectic or near-eutectic compositions). It is generally advantageous to have some Au or Ag present. For example, solders in which Au or Ag are a primary matrix or primary alloying material (e.g., at least 50 wt. % Au and/or Ag) are possible, such as Au-20 wt. %Sn eutectic (m.p. =280° C.), Au-12.5 wt. % Ge eutectic, (m.p.=361° C.), Au-3.2 wt % Si eutectic (m.p.=363° C.), Au-25.5 wt % Sb eutectic (m.p.=360° C.), Au42 wt % In (m.p.=495° C.) or Sn-3.5 wt. % Ag eutectic (m.p.=221° C.). The rare earth elements are then added as discussed above.

For solders not based on Au or Ag, e.g., Pb—Sn, Bi—Sn, Sn—Sb, or Sn—In, Au and/or Ag are advantageously added. For example, it is possible to alloy Sn-37% Pb, Pb-5% Sn, Bi48% Sn, Sn-5% Sb, Sn45% In, or elemental metals such as Sn or In, with Au or Ag, together with one or more of the rare earth elements. A useful range for Au and/or Ag additions in these solders is 0.1–30 wt. % Au and/or Ag, typically 0.2–5 wt. %, based on the weight of the entire composition, along with the amounts of rare earth elements listed above. Thus, such solders have at least 0.1 wt. % Au and/or Ag. For these solders, the amount of rare earths added depend on the amount of added Au or Ag, since the Au or Ag protects the rare earths from oxidation. To provide useful results for solders not based on Au or Ag, the rare earths are typically added in an amount of 0.01 to 50 wt. %, based on the weight of the added Au or Ag.

Because the rare earth atoms are required primarily for interfacial chemical bonding reactions, a relatively small amount is generally sufficient. As noted above, the presence of Au or Ag in the solder composition is not an absolute necessity as long as the particular microstructure is attained.

The solders of the invention are useful for a variety of electronic or optical device applications where there is a need to make electrical, mechanical, or thermal connections between oxide and metal or between oxide and oxide. Surfaces onto which the solders are able to directly bond, without the need for an intermediate metallization layer, include $SiO_2$, $Al_2O_3$, NiO, $Cr_2O_3$, $TiO_2$, $NbO_2$, $Fe_2O_3$, $Ta_2O_5$, $ZrO_2$, CuO, ZnO, and compound oxides such as $LiNbO_3$. In addition, it is also possible to attain useful bonding to difficult-to-solder metals such as Al, Si, Ti, Cr, Nb, Ta, Zr, Zn, and their alloys, which tend to easily form native oxides on their surface.

The solder composition of the invention is used in the same manner as conventional solders, e.g., bonding is facilitated by any conventional techniques, including a soldering iron, laser heating, infrared heating, and ultrasonic bonding. Soldering flux is typically not required, but is useful in reducing the oxidation of the molten solder, especially in air. The use of ultrasonics or other mechanical disturbances are often useful, e.g., to break up a surface oxide of a molten solder, in order to facilitate the solder-oxide interface bonding reaction. In addition, particularly in the case of optical fiber bonding, it is possible to first form a solder layer on the surface to which the fiber or other component is to be bonded, bring the fiber (stripped of any polymeric cladding) or component into contact with the solder layer, and then add more of the solder to the interface (e.g., by use of a soldering iron) to promote bonding.

The solder typically exhibits desirable mechanical properties, including high creep resistance, e.g., a creep strain rate of less than 10% per year, advantageously less than 1% per year. This creep resistance is particularly attainable with Sn—Au or Sn—Ag compositions containing rare earths. Bonds made with the solder typically exhibit a shear strength of at least 15 psi. The tensile strength of the solder is reflected in the examples below.

A variety of articles are capable of being formed according to the invention. One type of device for which oxide-bondable solders are particularly useful is optical fiber grating devices, which include Bragg gratings, long period gratings and diffraction gratings.

Reconfigurability of grating wavelength is highly useful in all types of gratings, particularly for applications such as wavelength division multiplexing, in which there is a need to selectively choose a specific wavelength channel and perform operations such as add/drop, dispersion compensation and gain equalization. One way of achieving such reconfiguration of grating wavelength is by the application of a tensile or compressive strain on the fiber grating, the strain effectively altering the periodicity of the grating. In order to be strained, the optical fiber grating must be bonded, either at both ends or along the entire length, to an actuator mechanism (based on magnetic, thermal, piezoelectric or magnetostrictive means). The bond must be strong since a stress of 9000 psi is generally required to achieve a wavelength shift of 1 nm in a 0.125μm diameter $SiO_2$ optical fiber (standard telecommunication fiber). The solders according to the invention are particularly useful for this purpose. Two examples of optical fiber grating devices that can be built using these solders are illustrated in FIGS. 4A and 4B.

Figure 4A:
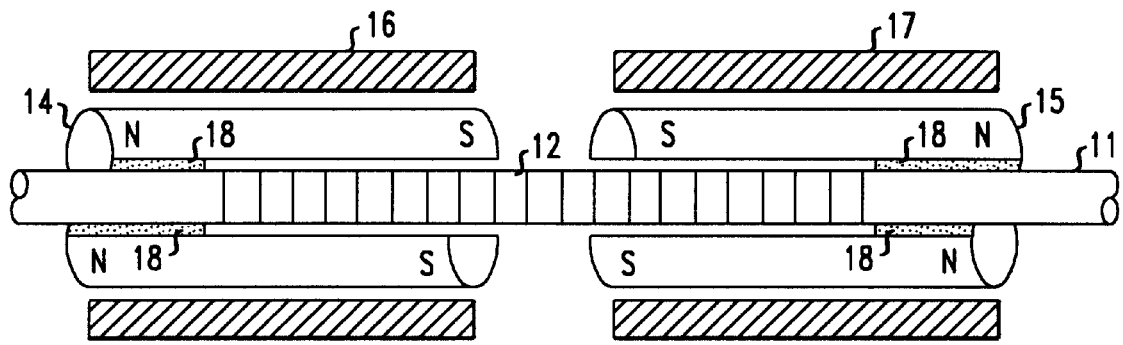
FIGS. 4A and 4B illustrate fiber grating devices comprising an oxide-bondable solder of the invention.

FIG. 4A is a magnetically-tunable fiber grating device (see U.S. Pat. No. 5,781,677 to Jin et al.) in which the ends of a fiber grating 12 (formed in a fiber 11) are firmly attached to two programmable magnets 14, 15 by bonding layers 18, advantageously formed using the solder of the invention. The bonding layers 18 allow transmission of force between the magnets to the grating. The solder is shown as bonding layers 18. The programmable magnet materials advantageously have magnetic properties modifiable by a pulse magnetic field. One or more electromagnets (solenoids) 16, 17 are disposed adjacent the magnets 14, 15 for providing a controllable magnetic field between them. When a pulse magnetic field of appropriate sign and strength is applied by the electromagnets 16, 17, the similar magnetic poles that are adjacent (S adjacent S) are forced apart, producing a tensile strain on the fiber grating. If dissimilar magnetic poles were to be placed adjacent, they would be forced together, producing a compressive strain on the grating. The magnitude of the strain is able to be controlled by varying the strength of the applied pulsed magnetic field. Examples of suitable magnets include Fe—Cr—Co, Fe—Al—Ni—Co (Alnico), Cu—Ni—Fe (Cunife), Co—Fe—V (Vicalloy), specially-processed, low-coercivity ($H_c$) rare earth cobalt (Sm—Co) or Nd—Fe—B magnets, and Ba-ferrite or Sr-ferrite magnets. The presence of native oxides makes direct bonding (bonding without metallization) to some of these magnetic materials difficult, if not impossible, using conventional solders, thereby showing the significance of the solders of the invention to such applications.

Figure 4B:
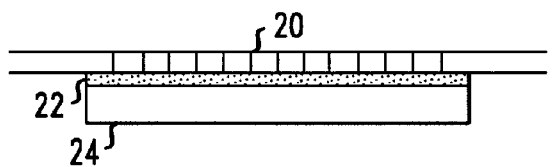

FIG. 4B depicts a thermally-tunable grating device structure (see H. Mavoori et al., "Enhanced Thermal and Magnetic Actuation for Broad-Range Tuning of FBG-Based Reconfigurable Add/Drop Devices", *Optics Left.*, Vol. 24, No. 11, 714 (1999)). In this device, the straining of the fiber grating 20 is performed by bonding the grating, along its whole length (with a bond layer 22), to a substrate material 24 with a high coefficient of thermal expansion ($\alpha$). When the temperature of the substrate 24 is altered, the changes in dimension due to thermal contraction/expansion induce a strain on the grating 20, thereby altering the periodicity. It is possible to form the continuous bond 22 (which is in contrast to the discrete bonds in the device of FIG. 4A) using the solders of the invention, which avoid the need for intermediate metallization layers. The substrate material 24 is typically a metallic element such as Al ($\alpha$=+23 ppm/° C.), a metallic alloy such as Ni—Ti ($\alpha$=−20 to −200 ppm/° C.) or a ceramic such as $ZrW_2O_8$ ($\alpha$=−5 to −11 ppm/° C.).

COMPARATIVE EXAMPLE 1 (PRIOR ART SOLDER)

About 0.2 g of Sn-3.5 wt % Ag solder was melted inside a 0.5 inch diameter quartz ($SiO_2$) tube. One end of the quartz tube was attached to an argon gas source for continuous Ar flow to prevent oxidation of solder during melting and solder processing, while the other end was open for the argon gas to exit. Upon melting of the solder by sideways heating with a small gas torch, the Sn—Ag solder melted and balled up as a sphere with no sign of wetting of the quartz tube. Mechanically forced spreading of the molten solder by an optical fiber ($SiO_2$) inserted through the open end of the quartz tube did not cause any wetting on the quartz tube or optical fiber. The wetting angle of the molten solder on the quartz surface was greater than 100 degrees. Upon solidification of the solder, the solder slipped out of the quartz tube easily as a ball, with no sign of bonding to the quartz tube. Similar results were seen with Au-20 wt. % Sn solder.

EXAMPLE 2

0.235 g of Sn-3.5 wt % Ag solder and 0.005 g of lutetium (Lu) metal (about 2% by weight of the base solder) were melted together and alloyed inside a 0.5 inch diameter quartz (SiO$_2$) tube. One end of the quartz tube was attached to an argon gas source for continuous Ar flow to prevent oxidation of solder during melting and processing, while the other end was open. The melting and alloying of solder was carried out by heating with a small gas torch, as in Comparative Example 1.

After alloying and solidification of the solder inside the quartz tube, the torch flame was made weaker, and was used to reheat and melt the solder. The molten solder was then pushed around by a quartz rod from the open end of the quartz tube. Wherever the molten solder touched the quartz tube, the solder wet and spread onto the quartz. The solder also provided a relatively strong bond to the quartz tube surface upon subsequent cooling to room temperature. The wetting angle was less than 60 degrees and typically much less than 45 degrees.

The solder was then re-melted, and through the open end of the quartz tube was pushed a 0.005" diameter., telecommunication-grade optical fiber (SiO$_2$) with the polymer coating stripped. The whole assembly was then allowed to cool to room temperature. In order to test the bond strength of the solder to the fiber and to the quartz, a weight of 0.5 lb., corresponding to a tensile stress of 26,000 psi, was placed on the free end of the optical fiber using a strong tape. The solder bond to the SiO$_2$ fiber as well as to the quartz tube remained strong without any mechanical failure.

Upon subsequent examination of the solder bonding to the quartz tube (inner surface), the solder could not be removed by mechanical force from the quartz tube surface. Continued force resulted in pulling of the solder from tube, but with fracturing and flaking of the quartz rather than breakage of the solder bond. Experiments with Sn—Ag solders containing Er gave similar results.

EXAMPLE 3

Figure 5A:
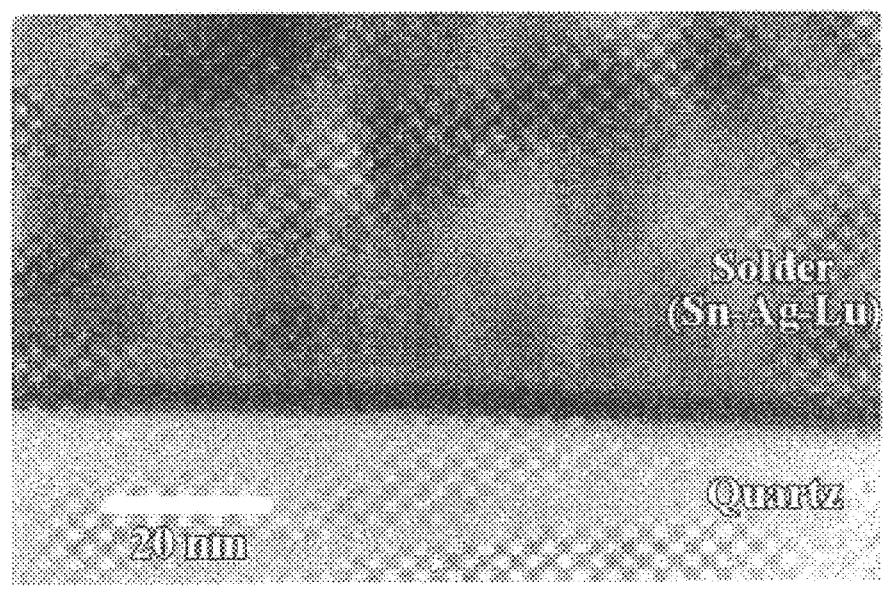
FIG. 5A is a cross-sectional TEM micrograph showing the interfacial details of a Sn—Ag—Lu solder of the invention directly bonded onto quartz.
Figure 5B:
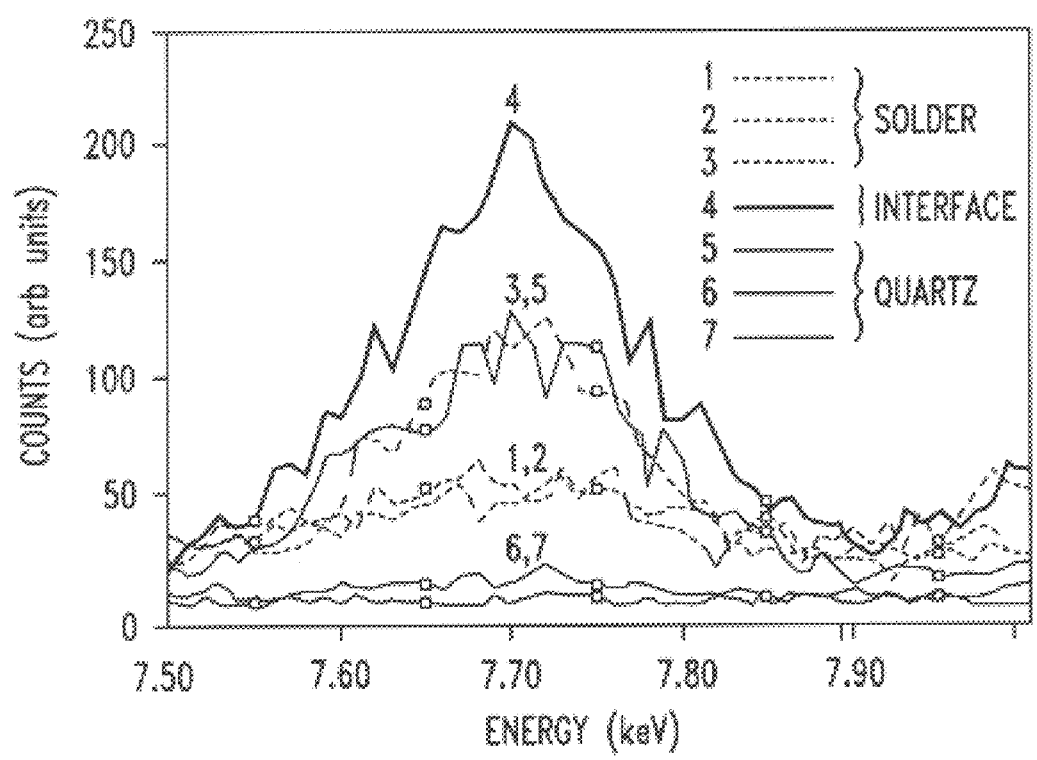
FIG. 5B is a TEM chemical analysis taken across the interfacial bonding region shown in FIG. 5A, showing the participation of the rare earth element in the bonding process.

A SnAgLu solder of the same composition as Example 2 was formed, re-melted using a soldering tip, and then applied to a quartz substrate. FIG. 5A shows a cross-sectional microstructure (by transmission electron microscopy) of the quartz-solder interface bond area. The micrograph shows that the soldering process involved formation of an interfacial region on the order of 10–50 Angstroms thick. This interfacial region was composed of amorphous phases and crystalline phases, one of which was Lu$_2$O$_3$. Chemical analysis of this region, shown in FIG. 5B, indicated that the bonding element, Lu, segregated at the interface, thereby contributing to the bonding process.

The addition of the small amount of the rare earth Lu did not significantly affect the melting point of the Sn-3.5% Ag eutectic solder. DSC (differential scanning calorimetry indicated that the melting point remained at a convenient low temperature of about 220° C.

EXAMPLE 4 solder was made by melting together 3.17 g of Au, 0.807 g of Sn (about 20% by weight of the alloy) and 0.082 g of Lu (about 2% by weight) inside a 5/16 inch diameter quartz (SiO$_2$) tube. One end of the tube was sealed while the other was attached to a mechanical vacuum pump to create a vacuum to prevent oxidation of the solder during the alloying process. Heating was accomplished using a small gas torch, as in the previous example. The solder was held molten at red-hot temperature (~800° C.) for 3 minutes to allow sufficient time for inter-mixing of the constituents and homogenization of the composition. On solidification after alloying, it was observed that the solder had formed a strong bond wherever it touched the inner walls of the quartz tube. The bonding was so strong that the quartz tube had to be broken in order to free the pellet of the solder, and even the freed pellet contained numerous small pieces of the shattered quartz.

EXAMPLE 5

To demonstrate the oxide-wetting ability of the solder of Example 4, the following experiment was conducted: The outside surface of a 0.180 inch stainless steel tube was flame-oxidized to make it non-wettable by conventional solders (as a result of the formation of a stable layer of chromium oxide). One end of an optical fiber was laid flat against this oxidized stainless steel surface and a small quantity (~0.1 g) of the solder was used to bond the fiber to the stainless steel with the help of an ultrasonic hand-soldering iron. Ube soldering operation was performed in air, without the use of any flux, and thus ultrasonics were used to break up the oxide layer formed at the surface of the molten solder. If the soldering were to be done in an oxygen-free atmosphere, e.g., in an inert-gas or reducing-gas atmosphere, such as nitrogen or argon or with a small addition of hydrogen or formic acid vapor, or if a suitable flux were to be used, a conventional soldering operation would tend to be sufficient). A weight of 0.8 lb., corresponding to a tensile stress of 42,000 psi was placed onto the other end of the bonded optical fiber. Under such tensile loading, the solder bond to the SiO$_2$fiber as well as to the stainless steel surface remained secure with no sign of mechanical failure.

The addition of a small amount of rare earth Lu did not significantly alter the melting point of the Au-20% Sn solder, as established by differential scanning calorimetry (DSC), which indicated the melting point to remain at about 280° C.

EXAMPLE 6

A solder with the composition of the solder in Example 4 was made by placing the constituent metal elements inside a quartz tube of ~5/16 inch inside diameter, and melting the metals in vacuum by using a gas torch and mechanical agitation. The molten and alloyed solder was kept at ~800° C. for ~3 minutes, and then was solidified at a cooling rate of ~6000° C./hr. A small sample of the solder was cut and a laboratory soldering gun was used in air to melt and bond the solder in about 5 seconds onto a preheated quartz substrate surface at ~300 to 350° C. The soldered material was allowed to cool and solidify at a rate of at least 12000° C./hr. The cross-sectional microstructure of the solder bond region is shown in FIG. 1. Islands 100 of rare earth intermetallics are seen within the matrix 110.

EXAMPLE 7

A Sn—Ag—Lu solder alloy with the composition of the solder in Example 2 was made by placing the constituent metal elements inside a quartz tube of ~5/16 inch inside diameter, and melting the metals in vacuum by using a gas torch and mechanical agitation. The molten and alloyed solder was kept at ~800° C. for ~3 minutes, and then was solidified at a cooling rate of ~6000° C./hr. A small sample of the solder was cut and a laboratory soldering gun was used in air to melt and bond the solder in about 5 seconds onto a preheated quartz substrate surface at ~280° C. The soldered material was allowed to cool and solidify at a rate of at least 6000° C./hr. The cross-sectional microstructure of the solder bond region is shown in FIG. 2. Islands 200 of rare earth intermetallics are seen within the matrix 210.

Other embodiments of the invention will be apparent to those skilled in the art from consideration of the specification and practice of the invention disclosed herein.

What is claimed is:

1. An article comprising a solder composition that comprises:

one or more elements selected from the group consisting of Sn, Sb, In, Bi, Zn, and Pb; and 0.01 to 20 wt. % of one or more rare earth elements, wherein the microstructure of the solder composition consists essentially of a matrix and islands of one or more intermetallic compounds in the matrix, wherein the one or more intermetallic compounds comprise at least a portion of the one or more rare earth elements, wherein the average effective diameter of the islands is less than 60 µm, and wherein the matrix comprises a base solder material comprising at least a portion of the one or more elements.

2. The article of claim 1, wherein the average effective diameter of the islands is less than 20 µm.

3. The article of claim 1, wherein the solder composition further comprises at least 0.1 wt. % Au, Ag, or mixtures thereof, based on the weight of the total composition.

4. The article of claim 3, wherein the amount of Au, Ag, or mixtures thereof is sufficient to reduce the rate of oxidation of rare earth in the solder by at least 20% compared to a substantially identical solder composition without the Au, Ag, or mixtures thereof, and wherein the Au, Ag, or mixtures thereof provide solid solubility for at least a portion of the one or more rare earth elements.

5. The article of claim 3, wherein the solder composition comprises greater than 50 wt. % Au, Ag, or mixtures thereof.

6. The article of claim 5, wherein the solder composition comprises 0.1 to 5 wt. % of the one or more rare earth elements.

7. The article of claim 6, wherein the solder composition comprises 0.2 to 2 wt. % of the one or more rare earth elements.

8. The article of claim 3, wherein the solder composition comprises 0.1 to 30 wt. % Au, Ag, or mixtures thereof.

9. The article of claim 8, wherein the solder composition comprises 0.2 to 5 wt. % Au, Ag or mixtures thereof.

10. The article of claim 3, wherein the solder composition consists essentially of Au, Sn, and the one or more rare earth elements, or Ag, Sn and the one or more rare earth elements.

11. The article of claim 1, wherein the one or more rare earth elements are selected from the group consisting of Y, La, Ce, Pr, Nd, Sm, Gd, Tb, Dy, Ho, Er, Tm, Yb, and Lu.

12. A process for fabricating an article, comprising the step of bonding surfaces of two or more components with a solder composition that comprises:

one or more elements selected from the group consisting of Sn, Sb, In, Bi, Zn, and Pb; and 0.1 to 20 wt. % of one or more rare earth elements, wherein the microstructure of the solder composition consists essentially of a matrix and islands of one or more intermetallic compounds in the matrix, wherein the one or more intermetallic compounds comprise at least a portion of the one or more rare earth elements, wherein the average effective diameter of the islands is less than 60 µm, and wherein the matrix comprises a base solder material comprising at least a portion of the one or more elements.

13. The process of claim 12, wherein the average effective diameter of the islands is less than 20 µm.

14. The process of claim 12, wherein the solder composition further comprises at least 0.1 wt. % Au, Ag, or mixtures thereof, based on the weight of the total composition.

15. The process of claim 14, wherein the amount of Au, Ag, or mixtures thereof is sufficient to reduce the rate of oxidation of rare earth in the solder by at least 20% during bonding compared to a substantially identical solder composition without the Au, Ag, or mixtures thereof, and wherein the Au, Ag, or mixtures thereof provide solid solubility for at least a portion of the one or more rare earth elements.

16. The process of claim 15, wherein the solder composition comprises greater than 50 wt. % Au, Ag, or mixtures thereof.

17. The process of claim 16, wherein the solder composition comprises 0.1 to 5 wt. % of the one or more rare earth elements.

18. The process of claim 17, wherein the solder composition comprises 0.2 to 2 wt. % of the one or more rare earth elements.

19. The process of claim 14, wherein the solder composition comprises 0.1 to 30 wt. % Au, Ag, or mixtures thereof.

20. The process of claim 19, wherein the solder composition comprises 0.2 to 5 wt. % Au, Ag or mixtures thereof.

21. The process of claim 14, wherein the solder composition consists essentially of Au, Sn, and the one or more rare earth elements, or Ag, Sn and the one or more rare earth elements.

22. The process of claim 12, wherein the one or more rare earth elements are selected from the group consisting of Y, La, Ce, Pr, Nd, Sm, Gd, Tb, Dy, Ho, Er, Tm, Yb, and Lu.

23. The process of claim 12, wherein the solder composition exhibits a creep strain rate of less than 10% per year.

24. The process of claim 12, wherein the bonded surface of at least one of the components comprises an oxide, and wherein the bonding is performed in the absence of an intermediate metallizing layer.

25. The process of claim 12, wherein the bonded surface of at least one of the components comprises an oxide s elected from the group consisting of $Al_2O_3$, $SiO_2$, NiO, $Cr_2O_3$, $TiO_2$, $NbO_2$, $Fe_2O_3$, $Ta_2O_5$, $ZrO_2$, CuO, and ZnO, or a metal selected from the group consisting of Al, Si, Cr, Ti, Nb, Ta, Zr, and Zn.

26. The process of claim 12, wherein at least one of the components is a silica-based optical fiber, a silica-based optical fiber grating, or silica-based or phosphate glass-based planar waveguide.

* * * * *